June 25, 1935.  R. S. M. MITCHELL  2,005,948
BALL JOINT ELEMENT
Filed Feb. 8, 1932  2 Sheets-Sheet 1
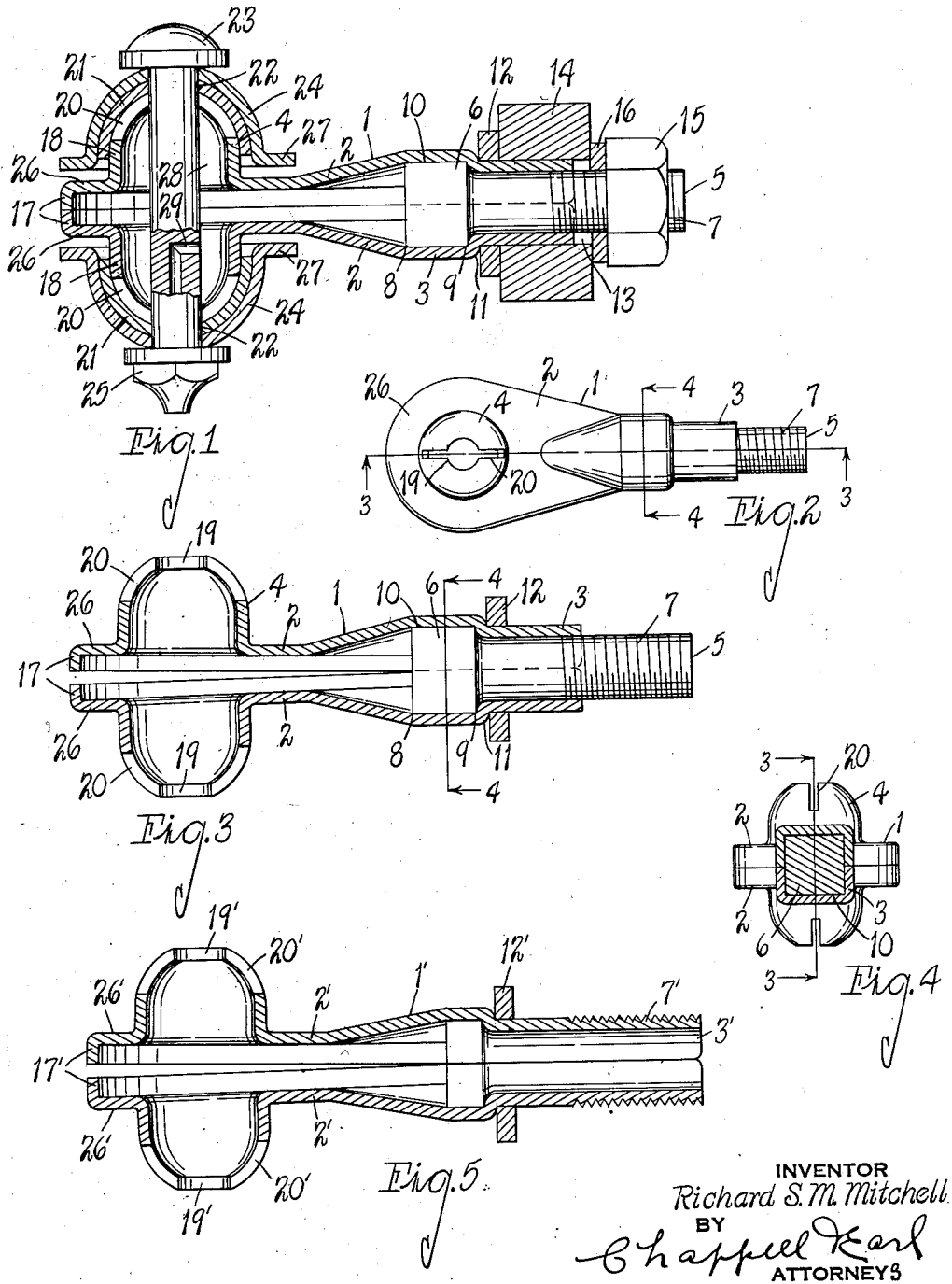
INVENTOR
Richard S. M. Mitchell
BY
Chappell Earl
ATTORNEYS June 25, 1935.　　　R. S. M. MITCHELL　　　2,005,948
BALL JOINT ELEMENT
Filed Feb. 8, 1932　　　2 Sheets-Sheet 2

INVENTOR
Richard S. M. Mitchell
BY
Chappell & Earl
ATTORNEYS

Patented June 25, 1935

2,005,948

UNITED STATES PATENT OFFICE 2,005,948

BALL JOINT ELEMENT

Richard S. M. Mitchell, Detroit, Mich.

Application February 8, 1932, Serial No. 591,733

2 Claims. (Cl. 287—100)

The main object of this invention is to provide a ball joint element which is light and simple in construction, very economical to manufacture, and highly efficient in operation.

Another object of the invention is to provide a joint member comprising a pair of complemental sheet metal stampings which are secured together at their ends and are so shaped that the inherent resilience of the metal tends to keep the joint tight.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary longitudinal section of a joint embodying my invention.

Fig. 2 is a reduced elevation of the member without its end securing means.

Fig. 3 is a longitudinal section on a line corresponding to line 3—3 of Figs. 2 and 4, parts being shown in full lines.

Fig. 4 is a transverse section on a line corresponding to line 4—4 of Figs. 2 and 3.

Fig. 5 is a view similar to Fig. 3 of a modification.

Figure 6:
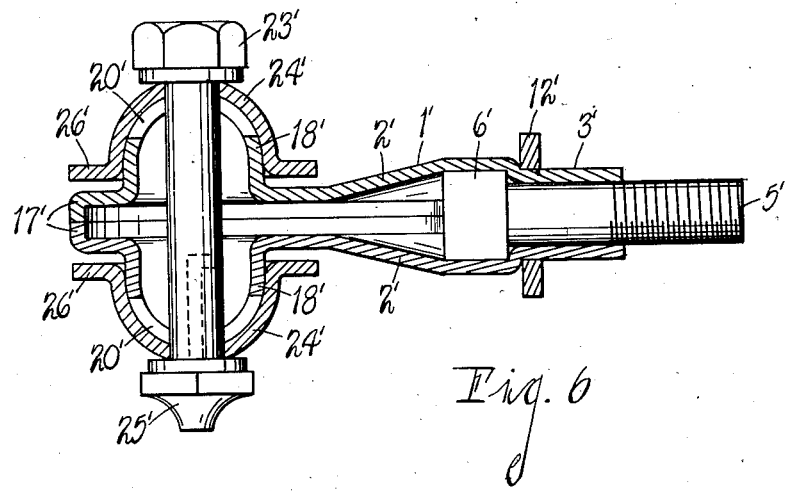
Fig. 6 is a view similar to Fig. 1 of a further modification.

Referring to the embodiment of my invention shown in Figs. 1 to 4 inclusive, numeral 1, in general, indicates a joint member which consists of a pair of complemental sheet metal stampings 2 which are provided with suitably shaped portions forming a tubular shank portion 3 at one end and a hollow ball 4 at the other end. A bolt 5 having a non-circular head 6 is disposed within the shank 3, with a threaded portion 7 thereof extending beyond the end of the joint member 1, as illustrated. Spaced internal shoulders 8 and 9 are formed within the member 1 for limiting longitudinal movement of the bolt 5 relative to the member 1. The internal surface 10 of the member 1 is also similar to the non-circular head 6 so that the bolt 5 is prevented from turning on its own axis within the member 1.

The member 1 is also provided with an external shoulder 11 which constitutes an abutment for the ring 12 which embraces the stampings 2 and secures them together and upon the bolt which constitutes an extension of the shank. The tubular end 3 of member 1 is disposed within the opening 13 of the support 14 and is held in place by the nut 15 threaded upon the bolt 5 and bearing against the washer 16 which engages the support 14. The tightening of the nut 15 tends to force the ring 12 against the shoulder 11.

The adjacent surfaces 17 of the stampings 2 are inclined away from each other from the bolt head 6 toward the ball and, as illustrated by Fig. 3, so that when the ball is disposed within a socket the inherent resilience of the stampings tend to hold the parts of the joint in yielding bearing engagement.

The semi-spherical ball portions 18 are provided with alined openings 19 and longitudinally extending opposed slots 20. Cup-like bushings 21 which may be of self-lubricating material are disposed over the ball portions 18, as illustrated by Fig. 1, these cup-like bushings being provided with openings 22 which are alined with the corresponding openings 19 in the ball portions. The cup-like bushings 21 are held in engagement with the ball portions 18 by the bolt 23 extending through the alined openings and the flanged semi-spherical socket joint portions 24 of the connecting link or part. The nut 25 of the bolt 23 is tightened as desired, the edges of the stampings being shown in abutting relation. A flange 26 surrounds the ball 4 to provide surfaces opposed to the flanges 27 of the opposed portions 24 of the connecting member. When formed in this manner, an oil-tight reservoir 28 is formed on the inside of the joint member 1 so that when oil or grease for lubricating purposes is supplied thereto through the opening 29 in the bolt 23, the latter is permanently sealed therein to lubricate the bearing between the connecting member and the ball 4.

Referring to Fig. 5, the bolt 5 described above in connection with Figs. 1 to 4 inclusive, may be entirely dispensed with by elongating the tubular end 3' of the member 1' and providing threads 7' on the exterior thereof corresponding to the threads 7 on the bolt 5 in the above modifications. Otherwise, the modification illustrated by Fig. 5 is similar to that described above in connection with Figs. 1 to 4, inclusive.

Referring to Fig. 6, there is illustrated a joint member similar to that described above in connection with Figs. 1 to 4, with the exception that the bushing 21 is entirely omitted from the structure, the semi-spherical portions 24' of the ball member directly engaging the portions 18' of the socket member. Otherwise, the modification illustrated in Fig. 6 is similar to that described above in connection with Figs. 1 to 4, inclusive.

Figure 7:
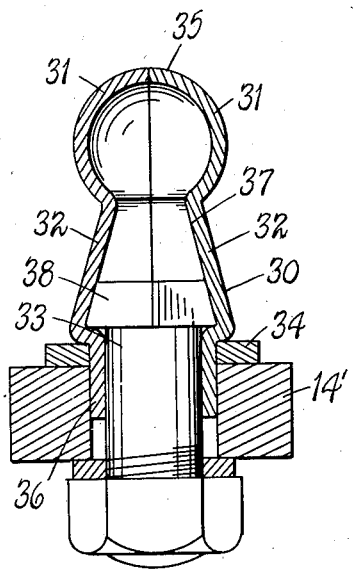
Fig. 7 is a view similar to Fig. 1 of still another modification.

Referring to Fig. 7, there is illustrated a ball joint member 30 having ball portions 31 at one end thereof which are held together by the inherent resilience of the sheet metal stampings 32 constituting the member by virtue of their shape and the forces exerted by bolt 33, the ring 34, and the support 14'. In this case, the abutting surfaces 35 of the stampings 32 are inclined away from each other in a direction extending from the ball 35 toward the tubular end 36. In this modification also, the interior 37 of the ball joint member 30 is upwardly and inwardly inclined to correspond to the shape of the head 38 of the bolt 33.

The joint members illustrated are particularly designed for use in connection with automobile shock absorbers. My improvements are, however, adapted for a great variety of uses. Heretofore, the ball joint members have commonly been manufactured out of solid members by expensive die-casting and machine processes. By forming the members of simple complemental sheet metal stampings, I obviate practically all of this machining expense, and in addition provide a member that is not only simple yet strong in construction, but one that is extremely light in weight. A considerable amount of metal is saved by reducing the weight of the joint members in this manner. Furthermore, by virtue of the novel shape of the stampings the joint is maintained tight at all times and no rattling results and no adjustments are required.

My improved structure provides for a rigid joint, the movable elements of which, while being flexible in themselves, are susceptible to movement only in one plane. This important feature allows "side sway" and "shimmying" between the chassis and the axle housing of the vehicle, but offers substantial resistance to such movements. In prior structures, the sidewise flexure has been taken care of in the joint, which offers little or no resistance thereto. In my improved structure, the sidewise flexure is not obtained in the joint, which is rigid, but in the flexible members themselves, where the resistance to such flexure is considerable. Furthermore, my structure provides for a bearing, which seals the lubricant in and the dust and other foreign matter out. This is a very valuable feature, and one that is new in so far as I am aware.

Various changes and adaptations may be made in the details of construction and design of the above specifically described embodiments of my invention without departing from the spirit thereof, such changes and modifications being restricted only by the scope of the following claims.

Having thus described my invention, what I claim as new and desire to secure by Letters Patent, is:

1. A frictionless joint comprising a flexible inner joint member having opposed hollow semi-spherical portions at its end forming a large central lubricant chamber and provided with opposed central openings on a common axis extending transversely of the longitudinal axis of the member and longitudinal relatively narrow lubricating slots radiating from said openings, self-lubricating semi-spherical cup-like bushings disposed over said semi-spherical portions and having central openings alined with the corresponding central openings therein, a flexible outer joint member having semi-spherical socket portions at its end disposed over said bushings and having central openings alined with the corresponding central openings therein and in the bushings, and a bolt fitting exactly through said central openings whereby said joint members are free at their joint for movement only in the plane of their longitudinal axes, but are capable of flexing in other directions by virtue of their inherent flexibility.

2. A frictionless joint comprising a flexible inner joint member having opposed hollow semi-spherical portions at its end forming a large central lubricant chamber and provided with opposed central openings on a common axis extending transversely of the longitudinal axis of the member and longitudinal relatively narrow lubricating slots radiating from said openings, a flexible outer joint member having semi-spherical socket portions at its end disposed over opposite sides of said inner portions and having central openings alined with the corresponding central openings therein, and a bolt fitting exactly through said central openings whereby said joint members are free at their joint for movement only in the plane of their longitudinal axes, but are capable of flexing in other directions by virtue of their inherent flexibility.

RICHARD S. M. MITCHELL.